United States Patent
Asano et al.

(10) Patent No.: US 7,916,788 B2
(45) Date of Patent: Mar. 29, 2011

(54) MOTION PICTURE ENCODING METHOD AND DEVICE

(75) Inventors: Wataru Asano, Yokohama (JP); Shinichiro Koto, Kokubunji (JP); Naoto Date, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1408 days.

(21) Appl. No.: 11/384,389

(22) Filed: Mar. 21, 2006

(65) Prior Publication Data

US 2007/0036217 A1    Feb. 15, 2007

(30) Foreign Application Priority Data

Aug. 11, 2005    (JP) .................................. 2005-233448

(51) Int. Cl.
 *H04N 7/12*    (2006.01)
(52) U.S. Cl. ......... 375/240.14; 375/240.15; 375/240.23; 375/240.24; 375/240.16; 375/240.08
(58) Field of Classification Search ............. 375/240.14, 375/240.16
See application file for complete search history.

(56) References Cited

U.S. PATENT DOCUMENTS

| 6,324,216 | B1 * | 11/2001 | Igarashi et al. | ........... 375/240.14 |
| 7,061,981 | B2 * | 6/2006 | Takahashi et al. | ........ 375/240.16 |
| 7,280,597 | B2 * | 10/2007 | Zhang et al. | ............. 375/240.16 |

FOREIGN PATENT DOCUMENTS

JP    2004-266489    9/2004

OTHER PUBLICATIONS

"TM5 Overview", Test Model 5, (TM5); http://www.mpeg.org/MPEG/MSSG/tm5/, MPEG software Simulation Group, 25 pages, (May 5, 2000).

* cited by examiner

*Primary Examiner* — Shuwang Liu
*Assistant Examiner* — Dhaval Patel
(74) *Attorney, Agent, or Firm* — Finnegan, Henderson, Farabow, Garrett & Dunner, L.L.P.

(57) ABSTRACT

A motion picture encoding method includes searching for a first motion vector between an object block of an input motion picture and a reference image for a frame-based prediction mode, searching for a second motion vector between the object block and the reference image for a field-based prediction mode, generating a first and second predictive residuals in accordance with the first and second motion vector, extracting a first and second feature quantities indicating a first and second similarity between lines of the first and second predictive residual, selecting the frame-based prediction mode in a case where the first similarity is larger than the second similarity based on the first and the second feature quantity, selecting the field-based prediction mode in a case where the second similarity is larger than the first similarity, and inter-frame-coding the input motion picture in accordance with the selected prediction mode.

10 Claims, 7 Drawing Sheets

MOTION PICTURE ENCODING METHOD AND DEVICE

CROSS-REFERENCE TO RELATED APPLICATIONS

This application is based upon and claims the benefit of priority from prior Japanese Patent Application No. 2005-233448, filed Aug. 11, 2005, the entire contents of which are incorporated herein by reference.

BACKGROUND OF THE INVENTION

1. Field of the Invention

The present invention relates to motion picture encoding method and device.

2. Description of the Related Art

In international standards of motion picture encoding as in MPEG-2, H.264, either one of a frame-based prediction mode and a field-based prediction mode can be selected as a motion compensation prediction mode for use in encoding an interlace image. In the frame-based prediction mode, a frame is used as a unit (referred to as a picture in MPEG) of encoding. In the field-based prediction mode, a field is used as a unit of encoding. When the frame is used as the unit of encoding, a frame structure is referred to. When the field is used as the unit of encoding, a field structure is referred to.

In a case where an image has little motion, there is strong correlation between the fields. Therefore, it is more advantageous to use the frame-based prediction mode in motion compensation prediction. On the other hand, in a case where an image has an intense motion, since the correlation between the fields is weak, it is more advantageous to use the field-based prediction mode in the motion compensation prediction. To perform highly efficient encoding, it is necessary to appropriately select the motion compensation prediction mode. In Jpn. Pat. Appln. KOKAI Publication No. 2004-266489, a method is disclosed to select a mode having a larger vertical correlation coefficient of an image signal from the frame-based prediction mode and the field-based prediction mode. In MPEG Software Simulation Group, "Test Model 5 (aka TM5)" <URL:http://www.mpeg.org/MPEG/MSSG/tm5/5>, a method is disclosed to select a mode having a smaller sum of absolute values of predictive residual signals from the frame-based prediction mode and the field-based prediction mode.

A method of using the vertical correlation coefficient of the image signal in evaluating the motion compensation prediction mode is effective for in-frame coding to directly encode the image signal, but it is difficult to precisely select the prediction mode in inter-frame coding to encode the predictive residual signal.

On the other hand, in the method of using the predictive residual signal in the evaluation of the motion compensation prediction mode, it is possible to precisely select the prediction mode even in the inter-frame coding. However, since the mode is evaluated by the sum of the absolute values of the predictive residual signal, any similarity between lines is not evaluated. In other words, any high-pass component of the predictive residual signal, which influences an encoding efficiency during orthogonal transformation encoding of the predictive residual signal, is not considered. Therefore, a preferable prediction mode is not necessarily selected.

A technology referred to as hierarchical searching is known for the purpose of reducing an amount of calculation required for detecting a motion vector, which occupies a large part of processing during motion picture encoding. In the hierarchical searching, first a coarse motion vector is searched, and subsequently a fine motion vector is searched. According to the hierarchical searching, in many cases, no difference is observed between sums of absolute values of predictive residual signals in a frame structure and a field structure at a time when the coarse motion vector is searched. Therefore, it is necessary to perform the fine motion vector searching in both the frame structure and the field structure, and the amount of calculation increases.

BRIEF SUMMARY OF THE INVENTION

According to an aspect of the present invention, there is provided a motion picture encoding method comprises searching for a first motion vector between an object block of an input motion picture to be encoded and a reference image for a frame-based prediction mode; searching for a second motion vector between the object block and the reference image for a field-based prediction mode; generating a first predictive residual in accordance with the first motion vector; generating a second predictive residual in accordance with the second motion vector; extracting a first feature quantity indicating a first similarity between lines of the first predictive residual; extracting a second feature quantity indicating a second similarity between lines of the second predictive residual; selecting the frame-based prediction mode in a case where the first similarity is larger than the second similarity based on the first feature quantity and the second feature quantity; selecting the field-based prediction mode in a case where the second similarity is larger than the first similarity; and inter-frame-coding the input motion picture in units of block in accordance with the selected prediction mode.

DETAILED DESCRIPTION OF THE INVENTION

An embodiment of the present invention will be described hereinafter in detail with reference to the drawings.

Figure 1:
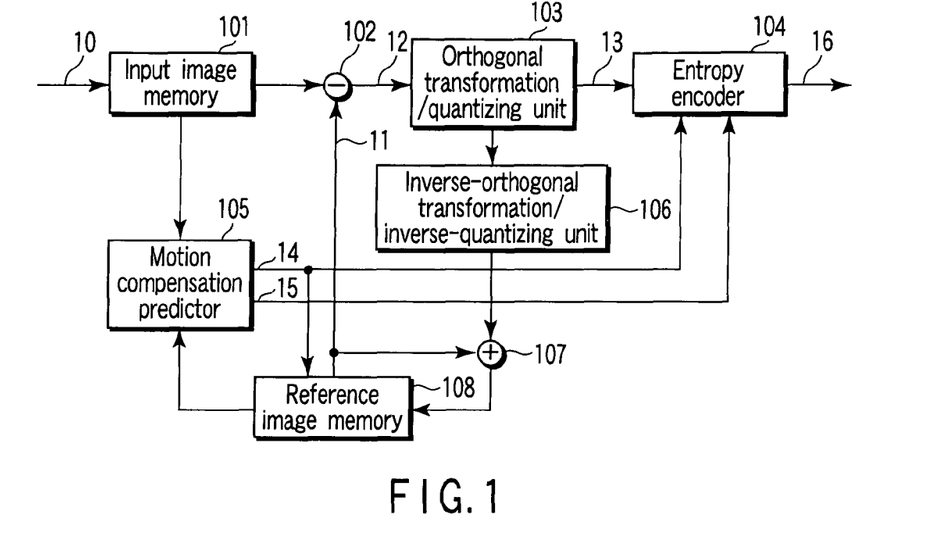
FIG. 1 is a block diagram of a motion picture encoding device in an embodiment of the present invention.

As shown in FIG. 1, in an embodiment of the present invention, a motion picture encoding apparatus includes: an input image memory 101; a subtracter 102; an orthogonal transformation/quantizing unit 103; an entropy encoder 104;

a motion compensation predictor 105; an inverse-orthogonal transformation/inverse-quantizing unit 106; an adder 107; and a reference image memory 108.

The input image memory 101 temporarily stores an input image signal 10 corresponding to a motion picture to be encoded. The motion compensation predictor 105 searches for an optimum motion vector in a determined search range by use of a local decoded image signal stored in the reference image memory 108 as a reference image signal, and the predictor predicts motion compensation by use of the optimum motion vector. The motion compensation predictor 105 further obtains a feature quantity indicating similarity between lines of a predictive residual signal in a frame structure and a field structure, and the predictor 105 selects a motion compensation prediction mode for performing the encoding in accordance with the feature quantity from the frame-based prediction mode and a field-based prediction mode.

Next, the motion compensation predictor 105 reads from the reference image memory 108 the searched optimum motion vector and the local decoded image signal of a region indicated by the selected prediction mode to thereby generate a predicted image signal 11. The motion compensation predictor 105 further outputs motion vector information 14 and prediction mode information 15, which indicates the selected prediction mode.

The subtracter 102 performs subtraction between the input image signal from the input image memory 101 and the predicted image signal 11 from the reference image memory 108 to generate the difference between the signals, that is, a predictive residual signal 12. The orthogonal transformation/quantizing unit 103 orthogonally-transforms and quantizes the predictive residual signal 12 to generate quantized orthogonal transformation coefficient information 13. The entropy encoder 104 performs entropy encoding on the quantized orthogonal transformation coefficient information 13, the motion vector information 14, and the prediction mode information 15, and generates an encoded string 16.

The inverse-orthogonal transformation/inverse-quantizing unit 106 inversely quantizes and inversely orthogonally transforms the quantized orthogonal transformation coefficient information 13 from the orthogonal transformation/quantizing unit 103 to reproduce the predictive residual signal. The adder 107 adds the reproduced predictive residual signal and the predicted image signal from the reference image memory 108 to generate the local decoded image signal. The local decoded image signal is stored as the reference image signal for the next motion compensation prediction in the reference image memory 108.

Figure 2:
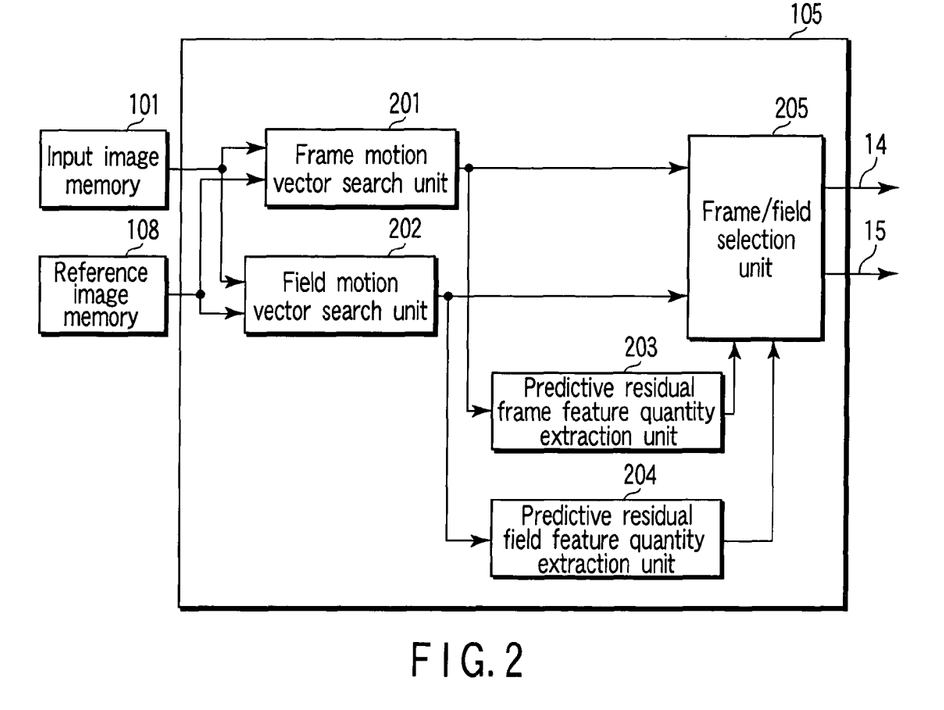
FIG. 2 is a block diagram showing a first typical example of a motion compensation predictor shown in FIG. 1.

Next, the motion compensation predictor 105 will be described in detail. FIG. 2 shows a first typical example of the motion compensation predictor 105. The motion compensation predictor 105 shown in FIG. 2 includes a frame motion vector search unit 201, a field motion vector search unit 202, a predictive residual frame feature quantity extraction unit 203, a predictive residual field feature quantity extraction unit 204, and a frame/field selection unit 205.

The frame motion vector search unit 201 receives from the input image memory 101 image signal data of an object block to be encoded, receives image signal data of the motion vector search range from the reference image memory 108, and performs motion vector search in the frame structure (i.e., motion vector search corresponding to the frame-based prediction mode) to thereby obtain a predictive residual signal (hereinafter referred to as the frame predictive residual signal) at a time when the encoding is performed in the frame-based prediction mode. To be more specific, the frame motion vector search unit 201 generates as the frame predictive residual signal a difference between the predicted image signal obtained by performing the motion compensation by use of the optimum motion vector searched in the frame structure and the input image signal of the object block.

The predictive residual frame feature quantity extraction unit 203 extracts from the frame predictive residual signal the feature quantity (hereinafter referred to as the predictive residual frame feature quantity) indicating the similarity between the lines of the frame predictive residual signal.

On the other hand, the field motion vector search unit 202 receives the image signal data of the object block from the input image memory 101, receives the image signal data of the motion vector search range from the reference image memory 108, and performs motion vector search (i.e., the motion vector search corresponding to the field-based prediction mode) in the field structure to thereby obtain a predictive residual signal (hereinafter referred to as the field predictive residual signal) at a time when the encoding is performed in the field-based prediction mode. That is, the field motion vector search unit 202 generates as the field predictive residual signal a difference between the predicted image signal obtained by performing the motion compensation by use of the optimum motion vector searched in the field structure and the input image signal of the object block.

The predictive residual field feature quantity extraction unit 204 extracts from the field predictive residual signal a feature quantity (hereinafter referred to as the predictive residual field feature quantity) indicating the similarity between lines of a field predictive residual signal.

The frame/field selection unit 205 compares the predictive residual frame feature quantity with the predictive residual field feature quantity, and selects the motion compensation prediction mode of the object block from either the frame-based prediction mode or the field-based prediction mode in accordance with the comparison result.

Figure 3:
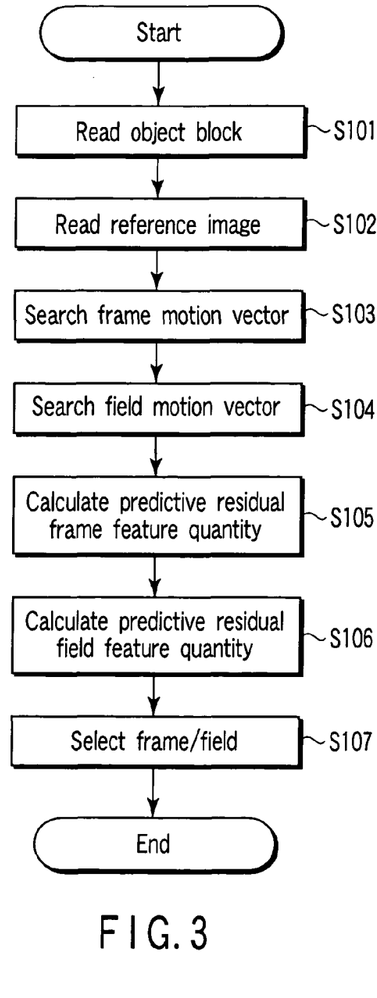
FIG. 3 is a flowchart showing a processing procedure of the motion compensation predictor of FIG. 2.

Next, there will be described a processing procedure of the motion compensation predictor 105 shown in FIG. 2 with reference to a flowchart of FIG. 3.

First, data of the object block of the input image signal is read from the input image memory 101 (step S101). Reference image signal data is similarly read from the reference image memory 108 (step S102). Next, the motion vector is searched in the frame structure to obtain the frame predictive residual signal (step S103). The motion vector is similarly searched in the field structure to obtain the field predictive residual signal (step S104). The order of the processing of steps S103 and S104 may be reverse, or the processing of step S103 may be performed simultaneously with that of step S104.

Next, for example, the feature quantity indicating the correlation between the lines of the frame predictive residual signal is extracted as the predictive residual frame feature quantity indicating the similarity between the lines in the frame-based prediction mode from the frame predictive residual signal (step S105). Similarly, the correlation between the lines of the field predictive residual signal is extracted as the feature quantity indicating the similarity between the lines in the field-based prediction mode from the field predictive residual signal (step S106). As the correlation between the lines, there is used, for example, a sum S of absolute differences between the lines, represented by, for example, the following equation:

$$S = \sum_{y=0}^{\frac{v}{2}-1} \sum_{x=0}^{h-1} [\text{abs}\{L(x, 2y) - L(x, 2y+1)\}] \qquad (1)$$

wherein L(x, y) indicates a value of a pixel in a position (x, y). When an object for which S is to be obtained is the predictive residual signal as in this example, L(x, y) denotes a difference value. When an object for which S is to be obtained is the input image signal, L(x, y) denotes a luminance value. Moreover, h and v denote the number of pixels in x-direction and y-direction of the object block, respectively. For example, h=16, v=32. Furthermore, abs{ } denotes a function to obtain an absolute value.

Next, as to the feature quantities of the frame predictive residual signal and the field predictive residual signal obtained in steps S105 and S106, respectively, for example, magnitudes of values are compared, and in accordance with the comparison result, the motion compensation prediction mode of the object block is selected from either the frame-based prediction mode and the field-based prediction mode (step S107). When the feature quantity indicating the similarity between the lines, for example, inter-line correlation is obtained with respect to the predictive residual signals in the frame-based prediction mode and the field-based prediction mode, a high-pass component of the predictive residual signal is reflected well in the feature quantity unlike a case where the sum of the absolute values of the predictive residual signals is used. Therefore, when the prediction mode having a higher similarity between the lines is selected from the frame-based prediction mode and the field-based prediction mode in step S107 based on the feature quantity calculated in steps S105 and S106, an encoding efficiency can further be improved.

Furthermore, even without performing the motion vector search with a high accuracy in steps S103 and S104, a remarkable difference appears between the feature quantities of the frame predictive residual signal and the field predictive residual signal. In consequence, since the accuracy of the motion vector search may be low, the amount of the calculation required for the motion vector search is reduced.

Next, there will be described a second typical example of the motion compensation predictor 105 with reference to FIG. 4. In the motion compensation predictor 105 shown in FIG. 4, an input image frame feature quantity extraction unit 206 and an input image field feature quantity extraction unit 207 are added to the motion compensation predictor of the first typical example shown in FIG. 2.

The input image frame feature quantity extraction unit 206 receives the image signal data of the object block from the input image memory 101, and extracts the feature quantity (hereinafter referred to as the input image frame feature quantity) indicating the similarity between the lines of the input image signal in the frame structure. The input image field feature quantity extraction unit 207 receives the image signal data of the object block from the input image memory 101, and extracts the feature quantity (hereinafter referred to as the input image field feature quantity) indicating the similarity between the lines of the input image signal in the field structure. A frame/field selection unit 208 receives the input image frame feature quantity, the input image field feature quantity, the predictive residual frame feature quantity, and the predictive residual field feature quantity, and compares the quantities to select the motion compensation prediction mode of the object block from either the frame-based prediction mode or the field-based prediction mode.

Figure 5:
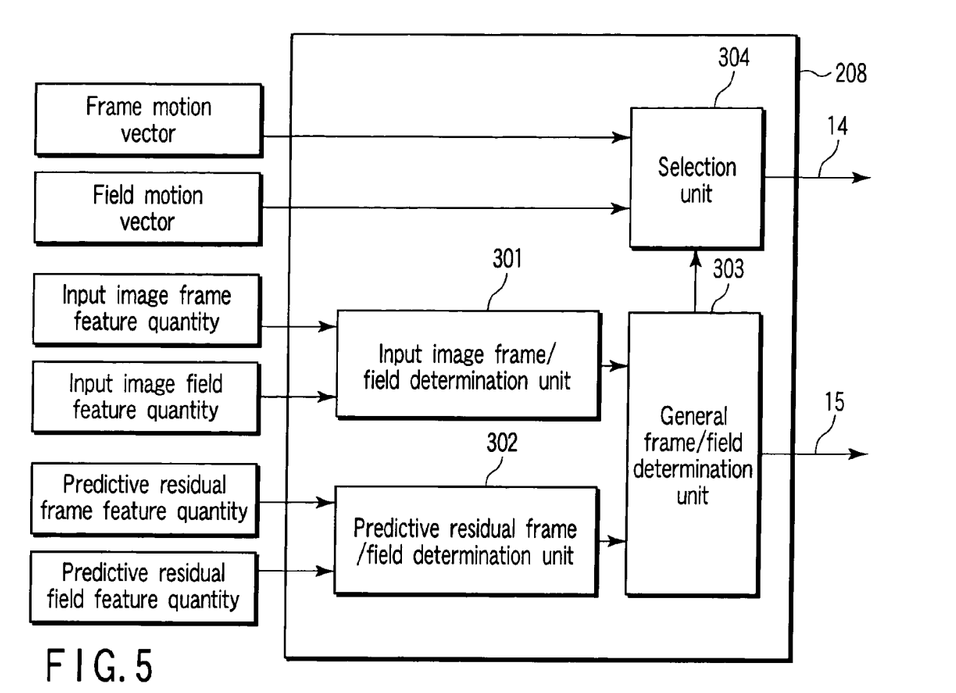
FIG. 5 is a block diagram showing an example of a frame/field selection unit shown in FIG. 4.

In the frame/field selection unit 208, as shown in FIG. 5, first an input image frame/field determination unit 301 compares magnitudes of values of the input image frame feature quantity and the input image field feature quantity, and determines whether the frame-based prediction mode or the field-based prediction mode is to be selected. On the other hand, a predictive residual frame/field determination unit 302 compares magnitudes of values of the predictive residual frame feature quantity and the predictive residual field feature quantity, and determines whether the frame-based prediction mode or the field-based prediction mode is to be selected.

Next, a general frame/field determination unit 303 performs final determination by use of the determination results of the input image frame/field determination unit 301 and the predictive residual frame/field determination unit 302, and a selection unit 304 selects the motion compensation prediction mode in accordance with the final determination result. For example, in a case where one of the input image frame/field determination unit 301 and the predictive residual frame/field determination unit 302 determines that the field-based prediction mode is to be selected, the field-based prediction mode is selected. When both of the units determine that the frame-based prediction mode is to be selected, the frame-based prediction mode is selected. An example of a selection method will be described later in detail.

Next, there will be described a processing procedure of the motion compensation predictor shown in FIG. 4 with reference to a flowchart of FIG. 6.

First, the data of the object block of the input image signal is read from the input image memory 101 (step S101). The reference image signal data is similarly read from the reference image memory 108 (step S102). Next, the motion vector is searched in the frame structure to obtain the frame predictive residual signal (step S103). The motion vector is similarly searched in the field structure to obtain the field predictive residual signal (step S104). The order of the processing of steps S103 and S104 may be reverse, or the processing of step S103 may be performed simultaneously with that of step S104.

Next, for example, the feature quantity indicating the correlation between the lines of the frame predictive residual signal is extracted as the predictive residual frame feature quantity indicating the similarity between the lines in the frame-based prediction mode from the frame predictive residual signal (step S105). Similarly, feature quantity indicating the correlation between the lines of the field predictive residual signal is extracted as the feature quantity indicating the similarity between the lines in the field-based prediction mode from the field predictive residual signal (step S106). As the feature quantity indicating the correlation between the lines, there is used, for example, the sum S of the absolute differences between the lines, represented by, for example, Equation (1).

Next, there is extracted an input image frame feature quantity indicating the correlation between the lines in the frame structure of the object block of the input image signal (step S108). Similarly, there is extracted an input image field feature quantity indicating the correlation between the lines in the field structure of the object block of the input image signal (step S109). The order of the processing of steps S108 and S109 may be reverse, or the processing of step S108 may be performed simultaneously with that of step S109. The processing of steps S108 and S109 may be performed at any time after the object block of the input image signal is read and before the processing of the frame/field selection is performed in S110.

Finally, the predictive residual frame feature quantity and the predictive residual field feature quantity extracted in steps S105 and S106 are compared with the input image frame feature quantity and the input image field feature quantity, and the prediction mode of the object block is selected from either the frame-based prediction mode or the field-based prediction mode (step S110). Specifically, in step S110, the prediction mode is checked with respect to the frame-based prediction mode or the field-based prediction mode having a higher similarity between the lines of the predictive residual signal based on the predictive residual frame feature quantity extracted in step S105 and the predictive residual field feature quantity extracted in step S106. Furthermore, the prediction mode is checked with respect to the frame-based prediction mode or the field-based prediction mode having a higher similarity between the lines of the input image based on the input image frame feature quantity extracted in step S107 and the input image field feature quantity extracted in step S108.

As a result, in a case where at least one of the prediction mode having higher similarity between the lines of the predictive residual signal and the prediction mode having a higher similarity between the lines of the input image is the field-based prediction mode, the field-based prediction mode is selected. On the other hand, in a case where both of the prediction mode having higher similarity between the lines of the predictive residual signal and the prediction mode having higher similarity between the lines of the input image are the frame-based prediction modes, the frame-based prediction mode is selected.

As described above, the frame-based prediction mode/the field-based prediction mode is selected by use of the feature quantity indicating the similarity between the lines of the input image signal in addition to the feature quantity indicating the similarity between the lines of the predictive residual signal. Then, even in a case where a motion between the fields in the frame of the input image signal is different from that between the fields in the frame of the reference image signals, the motion compensation prediction mode can be selected precisely. Furthermore, when a difference between the input image signal and the reference image signal is large, in-frame coding is selected, not the inter-frame coding. Even in this case, it is possible to select the prediction mode having a high encoding efficiency.

Figure 6:
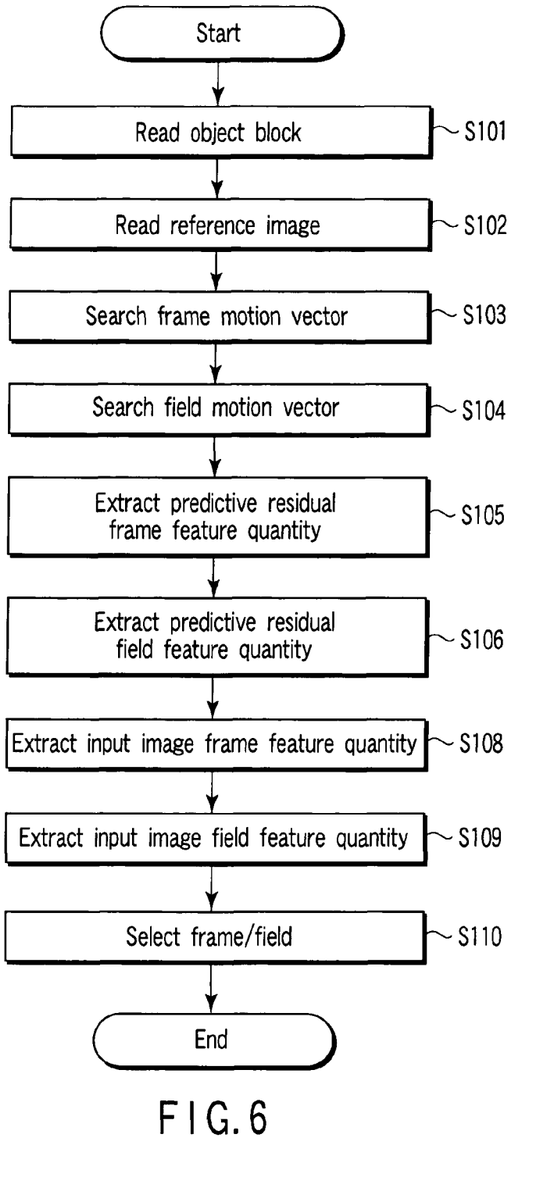
FIG. 6 is a flowchart showing a processing procedure of a motion compensation predictor shown in FIG. 4.
Figure 7:
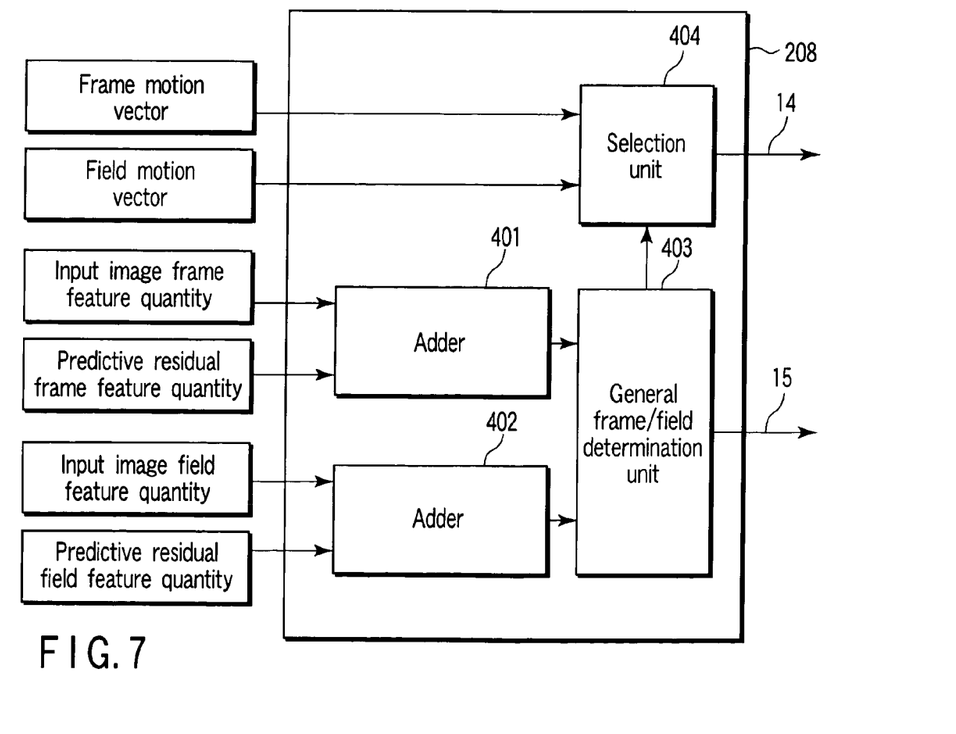
FIG. 7 is a block diagram showing another example of the frame/field selection unit shown in FIG. 4.

FIG. 7 shows a modification of the frame/field selection unit 208 of FIG. 6. The input image frame/field determination unit 301 and the predictive residual frame/field determination unit 302 in FIG. 6 are replaced with adders 401 and 402. In this case, although the structure is simple, it is possible to obtain an effect similar to that of the frame/field selection unit 208 shown in FIG. 4.

Figure 8:
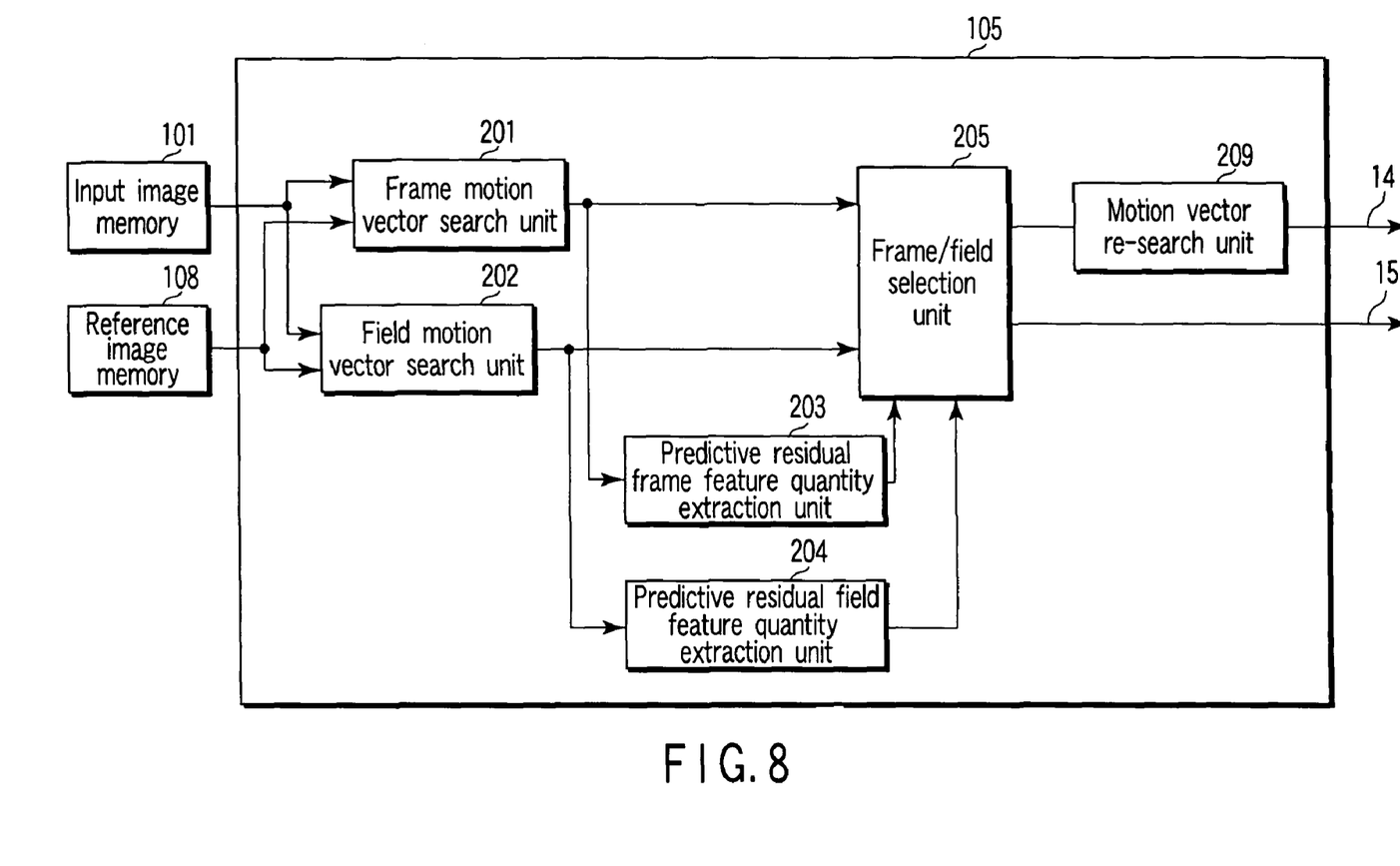
FIG. 8 is a block diagram showing a third typical example of the motion compensation predictor shown in FIG. 1.

Next, there will be described a third typical example of the motion compensation predictor 105 with reference to FIG. 8. In the motion compensation predictor 105 of FIG. 8, a motion vector re-search unit 209 is added to the motion compensation predictor 105 of the first specific example shown in FIG. 2. Among the motion vectors obtained by the frame motion vector search unit 201 and the field motion vector search unit 202, the motion vector re-search unit 209 again mainly searches the motion vector in the prediction mode selected by the frame/field selection unit 205 with a higher accuracy than that of the motion vector search units 201 and 202 in the previous stage.

Figure 9:
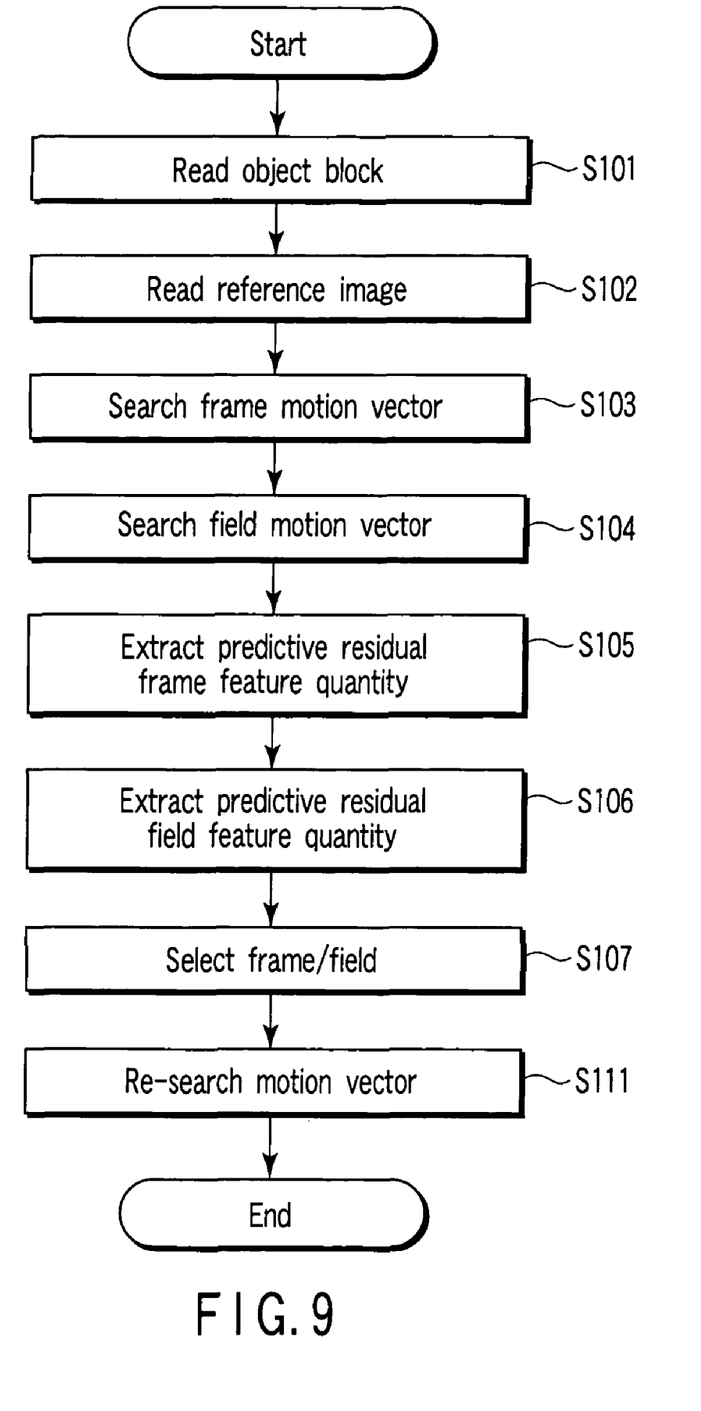
FIG. 9 is a flowchart showing a processing procedure of a motion compensation predictor shown in FIG. 8.

Next, there will be described a processing procedure of the motion compensation predictor 105 shown in FIG. 8 with reference to a flowchart of FIG. 9.

First, the object block of the input image signal is read from the input image memory 101 (step S101). The reference image signal is similarly read from the reference image memory 108 (step S102). Next, the motion vector is searched in the frame structure to obtain the frame predictive residual signal (step S103). The motion vector is similarly searched in the field structure to obtain the field predictive residual signal (step S104). The order of the processing of steps S103 and S104 may be reverse, or the processing of step S103 may be performed simultaneously with that of step S104.

Next, for example, the feature quantity indicating the correlation between the lines is extracted as the predictive residual frame feature quantity indicating the similarity between the lines in the frame-based prediction mode from the frame predictive residual signal (step S105). Similarly, feature quantity indicating the correlation between the lines is extracted as the feature quantity indicating the similarity between the lines in the field structure from the field predictive residual signal (step S106). As the feature quantity indicating the inter-line correlation, there is used, for example, the sum S of the absolute differences between the lines, represented by, for example, Equation (1).

Next, as to the feature quantities of the predictive residual signals in the frame-based prediction mode and the field-based prediction mode, for example, magnitudes of values are compared, and in accordance with the comparison result, the prediction mode of the object block is selected from the frame-based prediction mode and the field-based prediction mode (step S107)

Finally, among the frame motion vector obtained in step S103 and the field motion vector obtained in step S104, the motion vector corresponding to the prediction mode selected in step S107 is mainly searched again with higher accuracy than that of the motion vector search in steps S103 and S104 (step S111). It is to be noted that the motion vector corresponding to the prediction mode selected in step S107 is a motion vector in the frame structure in a case where the frame-based prediction mode is selected. The motion vector is a motion vector in the field structure in a case where the field-based prediction mode is selected.

Heretofore, a fine motion vector is required before selecting the frame/field in step S107. On the other hand, according to the embodiment of the present invention, the motion vector search does not require high accuracy before selecting the frame/field of step S107. On the other hand, since the high-accuracy motion vector is required for the prediction mode selected in step S107, the motion vector is searched again after selecting the frame/field. The motion compensation prediction is performed in the selected prediction mode by use of the motion vector searched again in this manner. In this case, while keeping the accuracy in the frame/field selection and the motion vector, the motion vectors to be searched are reduced, and the calculation amount can be effectively reduced.

As described above, according to one embodiment of the present invention, in the motion compensation prediction encoding, the prediction mode having a higher encoding efficiency can be selected from the frame-based prediction mode and the field-based prediction mode. Furthermore, the calculation amount is reduced in judging whether the prediction mode is to be the frame-based prediction mode or the field-based prediction mode.

Figure 4:
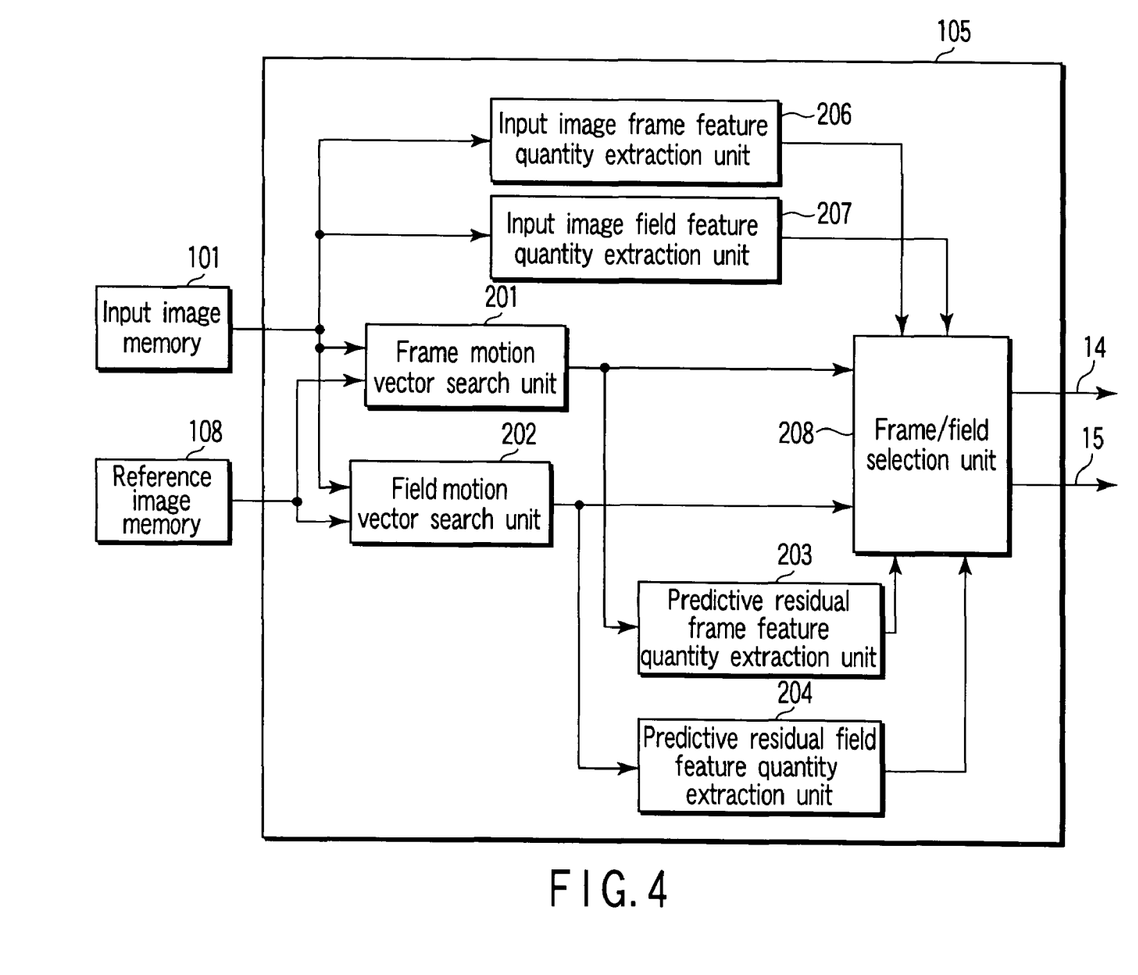
FIG. 4 is a block diagram showing a second typical example of the motion compensation predictor shown in FIG. 1.
Figure 10:
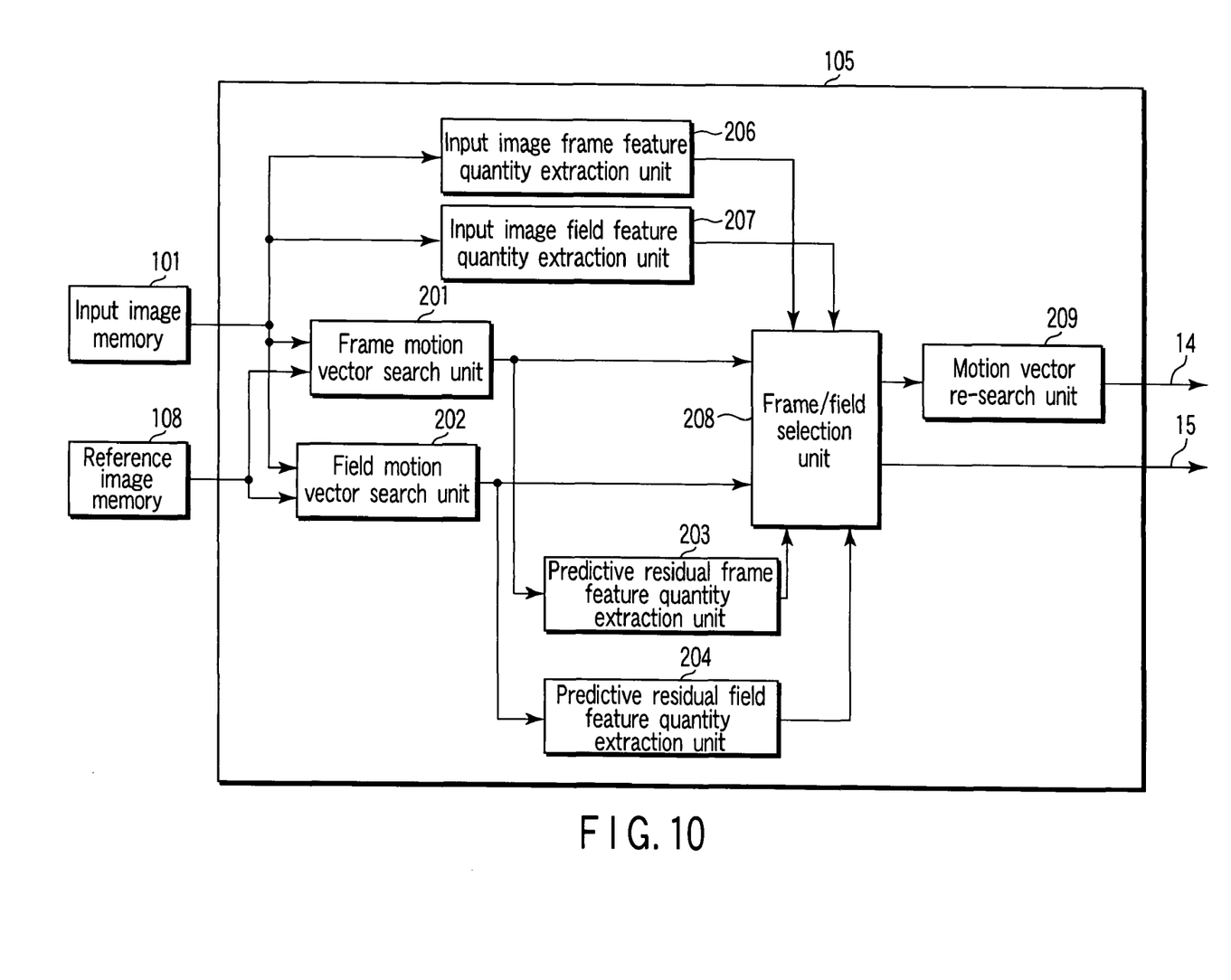
FIG. 10 is a block diagram showing a fourth typical example of the motion compensation predictor shown in FIG. 1.

As a fourth typical example of the motion compensation predictor 105, as shown in FIG. 10, needless to say, the motion vector re-search unit 209 may be added to the motion compensation predictor 105 of the second typical example shown in FIG. 4.

It is to be noted that the processing of the motion compensation prediction performed in the above embodiments may be performed by an exclusive-use hardware circuit, or the motion compensation prediction processing may be performed by a CPU which operates in accordance with a program. A program for allowing a computer to execute such processing may be presented to a user via a communication line such as internet. Furthermore, the program may be recorded in a recording medium such as a compact disc-read only memory (CD-ROM), and presented to the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A motion picture encoding method comprising:
   searching for a first motion vector between an object block of an input motion picture to be encoded and a reference image for a frame-based prediction mode;
   searching for a second motion vector between the object block and the reference image for a field-based prediction mode;
   generating a first predictive residual in accordance with the first motion vector;
   generating a second predictive residual in accordance with the second motion vector;
   extracting a first feature quantity indicating a first similarity between lines of the first predictive residual from the first predictive residual;
   extracting a second feature quantity indicating a second similarity between lines of the second predictive residual from the second predictive residual;
   extracting a third feature quantity indicating a third similarity between lines of the input image in a frame structure of the object block from the input image;
   extracting a fourth feature quantity indicating a fourth similarity between lines of the input image in a field structure of the object block from the input image;
   selecting one prediction mode from the frame-based prediction mode and the field-based prediction mode based on the first feature quantity, the second feature quantity, the third feature quantity and the fourth feature quantity; and
   inter-frame-coding the input motion picture in units of block in accordance with the selected prediction mode.

2. The motion picture encoding method according to claim 1, wherein the selecting includes:
   performing a first determination to determine a larger similarity between the first similarity and the second similarity based on the first feature quantity and the second feature quantity;
   performing a second determination to determine a larger similarity between the third similarity and the fourth similarity based on the third and the fourth feature quantities;
   selecting the field-based prediction mode in a case where at least one of the first determination and the second determination represents a first output corresponding to the field-based prediction mode; and
   selecting the frame-based prediction mode in a case where both of the first determination and the second determination represent a second output corresponding to the frame-based prediction mode.

3. The motion picture encoding method according to claim 1, which further comprises searching for a third motion vector with a higher accuracy than that for searching for the first motion vector and that for searching for the second motion vector according to the selected prediction mode, and wherein the inter-frame coding includes inter-frame-coding the input motion picture by use of the third motion vector.

4. A motion picture encoding apparatus comprising:
   a memory device to store image signal data of an object block of an input motion picture to be encoded;
   a first search unit coupled to receive the object block from the memory device and configured to:
      search for a first motion vector between the object block of the input motion picture to be encoded and a reference image for a frame-based prediction mode, and generate a first predictive residual;
   a second search unit configured to:
      search for a second motion vector between the object block and the reference image for a field-based prediction mode, and generate a second predictive residual;
   a first extraction unit configured to extract a first feature quantity indicating a first similarity between lines of the first predictive residual;
   a second extraction unit configured to extract a second feature quantity indicating a second similarity between lines of the second predictive residual;
   a third extraction unit configured to extract a third feature quantity indicating a third similarity between lines in a frame structure of the object block of the input image;
   a fourth extraction unit configured to extract a fourth feature quantity indicating a fourth similarity between lines in a field structure of the object block of the input image;
   a selection unit configured to select a prediction mode from either the frame-based prediction mode and the field-based prediction mode based on the first feature quantity, the second feature quantity, the third feature quantity, and the fourth feature quantity; and
   a coding unit configured to inter-frame-coding the input motion picture in units of block in accordance with the selected prediction mode.

5. The motion picture encoding apparatus according to claim 4, wherein the selection unit includes:
   a first determination unit configured to determine a larger similarity between the first similarity and the second similarity based on the first feature quantity and the second feature quantity; and
   a second determination unit configured to determine a larger similarity between the third similarity and the fourth similarity based on the third feature quantity and the fourth feature quantity, and wherein
   the selection unit is configured to select the field-based prediction mode in a case where at least one of the first determination unit and second determination unit determines a first output corresponding to the field-based prediction mode and to select the frame-based prediction mode in a case where both of the first determination unit and second determination unit determine a second output corresponding to the frame-based prediction mode.

6. The motion picture encoding apparatus according to claim 4, further comprising a third search unit configured to search for a third motion vector with a higher accuracy than that for searching for the first motion vector and that for searching for the second motion vector according to the selected prediction mode, and wherein the inter-frame coding includes inter-frame-coding the input motion picture by use of the third motion vector.

7. The motion picture encoding apparatus according to claim 4, wherein the first extraction unit is configured to extract an inter-line correlation of the first predictive residual as the first feature quantity.

8. The motion picture encoding apparatus according to claim 4, wherein the second extraction unit is configured to extract an inter-line correlation of the second predictive residual as the second feature quantity.

9. The motion picture encoding apparatus according to claim 4, wherein the third extraction unit is configured to extract an inter-line correlation in a frame structure of the object block from the input image as the third feature quantity.

10. The motion picture encoding apparatus according to claim 4, wherein the fourth extraction unit is configured to extract an inter-line correlation in a field structure of the object block from the input image as the fourth feature quantity.

* * * * *